United States Patent [19]

Fernandez et al.

[11] Patent Number: 5,956,720
[45] Date of Patent: Sep. 21, 1999

[54] METHOD AND APPARATUS FOR WEB SITE MANAGEMENT

[75] Inventors: Maria F. Fernandez, Cranford, N.J.; Daniela Dina Florescu, Paris, France; Jaewoo Kang, Somerset, N.J.; Alon Yitzchak Levy, Seattle, Wash.; Dan Suciu, Mountainside, N.J.

[73] Assignee: AT & T Corp, New York, N.Y.

[21] Appl. No.: 08/931,667

[22] Filed: Sep. 17, 1997

Related U.S. Application Data

[60] Provisional application No. 60/036,898, Feb. 6, 1997.

[51] Int. Cl.[6] .................................................... G06F 17/30
[52] U.S. Cl. ................................ 707/10; 707/1; 707/2; 707/3; 707/4; 707/6; 707/100; 707/104; 707/203
[58] Field of Search .................................... 707/1, 2, 3, 4, 707/6, 10, 100, 104, 203, 501; 370/352, 356, 405; 395/200.31, 200.32; 434/350; 713/201; 345/339, 348; 709/224

[56] References Cited

U.S. PATENT DOCUMENTS

| | | | |
|---|---|---|---|
| 5,600,831 | 2/1997 | Levy et al. ............................ | 395/602 |
| 5,793,964 | 8/1998 | Rogers ............................. | 395/200.32 |
| 5,860,071 | 1/1999 | Ball ........................................ | 707/100 |
| 5,867,495 | 2/1999 | Elliott .................................... | 370/352 |
| 5,870,559 | 2/1999 | Leshem ................................. | 709/224 |

OTHER PUBLICATIONS

Hu J et al.: WebinTool: A Generic Web to Database Interface Building Tool, Proceedings International Workshop on Database and Expert Systems Applications, Sep. 9, 1996, pp. 285–290.

*Primary Examiner*—Paul R. Lintz
*Assistant Examiner*—Diane D. Mizrahi

[57] ABSTRACT

A method and apparatus for managing a web-site. An information definition query is received for defining an integrated view of non-uniform information retrieved from a multiple sources across a network, and stored in multiple formats. An integrated view is created according to the information definition query. A site definition query is received for defining a site view for the non-uniform information at the web-site. The site view is created according to the site definition query. The non-uniform information is then presented on the web-site, typically in the form of a HTML document.

32 Claims, 3 Drawing Sheets

METHOD AND APPARATUS FOR WEB SITE MANAGEMENT

CROSS-REFERENCE TO RELATED APPLICATIONS

This application claims the benefit of U.S. Provisional application Ser. No. 60/036,898, filed Feb. 6, 1997, entitled "STRUDEL: A Web Site Management System."

FIELD OF THE INVENTION

The invention relates to web site management. More particularly, the invention relates to creating and maintaining a web site using a query language.

BACKGROUND OF THE INVENTION

Due to the popularity of the Internet and World Wide Web (WWW), a growing number of companies are creating web sites having a tremendous amount of information. For example, Cable News Network (CNN) has its own web site at "http:\\www.cnn.com" with current news and events in the United States and around the world. Similarly, AT&T Research has its own web site at "http:\\www.research.att.com" posting information on AT&T employees, such as their fields of research, publications, current projects, and so forth.

Creating and maintaining large web sites, however, is a tedious and time consuming task. A site designer must simultaneously preform at least three tasks: (1) choosing what information will be available at the site; (2) organizing that information in individual pages or in graphs of linked pages; and (3) specifying the visual pages using a graphical presentation language such as Hypertext Markup Language (HTML). Furthermore, since there is no separation between the physical organization of the information at a web site and a logical view prepared for the information, changing or restructuring a site become an unwieldy task. Typically, a web site comprises hundreds or even thousands of individual HTML pages ("web page"). If a web site manager wants to modify the visual presentation of information at a web site, the manager must access each individual web page one at a time and make the desired changes. This requires a tremendous amount of work. In addition, a web site manager might want different presentations for a web site depending on the viewer or the type of browser used. For example, access to AT&T's web-site might be different for internal AT&T users than external users. Another example would be that users might use different browsers such as Netscape Navigator, available from Netscape Communications, Inc., the Internet Explorer, available from Microsoft Corp, and so forth, thereby necessitating different versions of a webpage optimized for use with the browser. As a result, a web site manager would have to create and maintain multiple copies of each web page, which would add to the tediousness associated with maintaining the web site.

The difficulties in maintaining a web site are demonstrated by CNN's web site. When a user enters the Universal Resource Locator (URL) or Internet address for CNN's web site into a browser, an initial web page is presented to the user. This web page is referred to as the "root" web page. CNN's root web page provides the user with headlines of current domestic and world news. If a user wants to read an abstract of an article, the full text of the article, or related articles, the user simply clicks on the appropriate hypertext link to view the web page having the desired information ("linked web page"). CNN's web site also provides pictures and graphics along with some of its articles. The telecommunications technology allowing some users access to CNN's web site, however, is older and relatively slow. Thus, CNN offers a text-only view of its root web page to increase the speed in which the root web page is downloaded to the user's browser. CNN's web site, however, makes this feature available only for CNN's root web page, and not its linked web pages. One reason for this is that each individual web page would have to be accessed by the CNN web site manager, and all HTML commands to display image and graphic files would have to be manually removed. Moreover, each web page would have to be stored twice, once with the image and graphic HTML commands, and once without these commands. Both options are unacceptable to many web site managers.

In an attempt to solve the above problems, conventional web site management programs have been created to generate a web page using a query language rather than actually writing specific HTML commands for every web page, and storing these commands in separate files. Thus, when a web site manager needs to modify the web site, he merely modifies the query statements used in generating the web pages.

These conventional programs, however, are unsatisfactory for several reasons. First, these programs rely upon a programming language which is relatively complex, thereby trading one efficiency for another, namely, the tediousness of writing HTML commands for every web page for the difficulty of writing code using a complex programming language affecting all web pages. Second, these conventional programs require that all information or data presented by the web pages come from a single uniform data source such as a relational data base (RDB) or object-oriented data base (OODB). These programs are not capable of using information from multiple external sources stored in a variety of formats, as is the case with the information made available on such popular Wide Area Networks (WAN) as the Internet. This severely limits the robustness of the web site management program by limiting the domain of information from which the web site might draw to ultimately present to a user.

In view of the foregoing, it can be appreciated that a substantial need exists for a method and apparatus for creating and maintaining large web sites efficiently and effectively.

SUMMARY OF THE INVENTION

A method and apparatus for managing a web-site are provided. An information definition query is received for defining an integrated view of non-uniform information retrieved from a multiple sources across a network, and stored in multiple formats. An integrated view is created according to the information definition query. A site definition query is received for defining a site view for the non-uniform information at the web-site. The site view is created according to the site definition query. The non-uniform information is then presented on the web-site, typically in the form of a HTML document.

With these and other advantages and features of the invention that will become hereinafter apparent, the nature of the invention may be more clearly understood by reference to the following detailed description of the invention, the appended claims and to the several drawings attached herein.

DETAILED DESCRIPTION

The present invention includes a method and apparatus which applies concepts from data base management systems to the process of building web sites. In accordance with one embodiment of the present invention, a web site manager can separate the logical view of information available at a web site, the structure of that information in linked pages, and the graphical presentation of pages in HTML. First, the site builder defines independently the data that will be available at the site. This process may require creating an integrated view of data from multiple (external) sources. Second, the site builder defines the structure of the web site. The structure is defined as a view over the underlying information, and different versions of the site can be defined by specifying multiple views. Finally, the graphical representation of the pages in the web site is specified.

Figure 1:
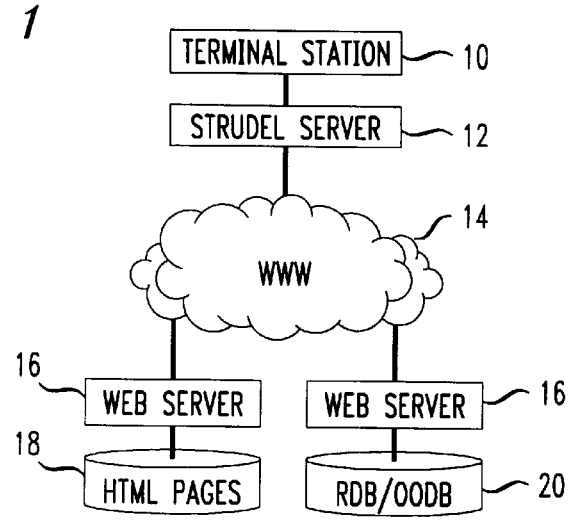
FIG. 1 a web site management system in accordance with one embodiment of the invention.

Referring now in detail to the drawings wherein like parts are designated by like references numerals throughout, there is illustrated in FIG. 1 a web site management system in accordance with one embodiment of the invention. This embodiment of the invention is referred to hereinafter as "STRUDEL". As shown in FIG. 1, terminal station 10 is connected to a server 12 implementing the functionality for STRUDEL ("STRUDEL Server 12"). It is worthy to note that although the functionality for STRUDEL is implemented on the server side of a client-server model in this embodiment of the invention, this functionality could also be implemented on the client side, or on any general purpose computer having a microprocessor of sufficient processing speed, and memory. Server 12 is connected to WWW 14, which includes web servers 16 which are connected to web page 18 and RDB/OoDB 20, respectively.

Terminal station 10 includes a personal computer having a microprocessor and means for storing data and/or software such as random access memory and/or a hard disk drive, and which is capable of communicating with a network. The client computer is capable of providing output for display to a user, for example through a video display. Such output may take the form of at least one of textual, graphic, animation, video, audio, or virtual object media. The client computer is also capable of accepting input from a user. Such input may be provided by means such as a keyboard, a mouse, a telephone touch pad, a television remote control, and so on.

STRUDEL Server 12 includes a server computer having a microprocessor and means for storing data and/or software such as random access memory and/or a hard disk drive, and which is capable of communicating with a network. Typically, a server computer is similar to a client computer, but is generally more powerful than a client in that it has greater processing power or larger amounts of static or dynamic memory.

Figure 2:
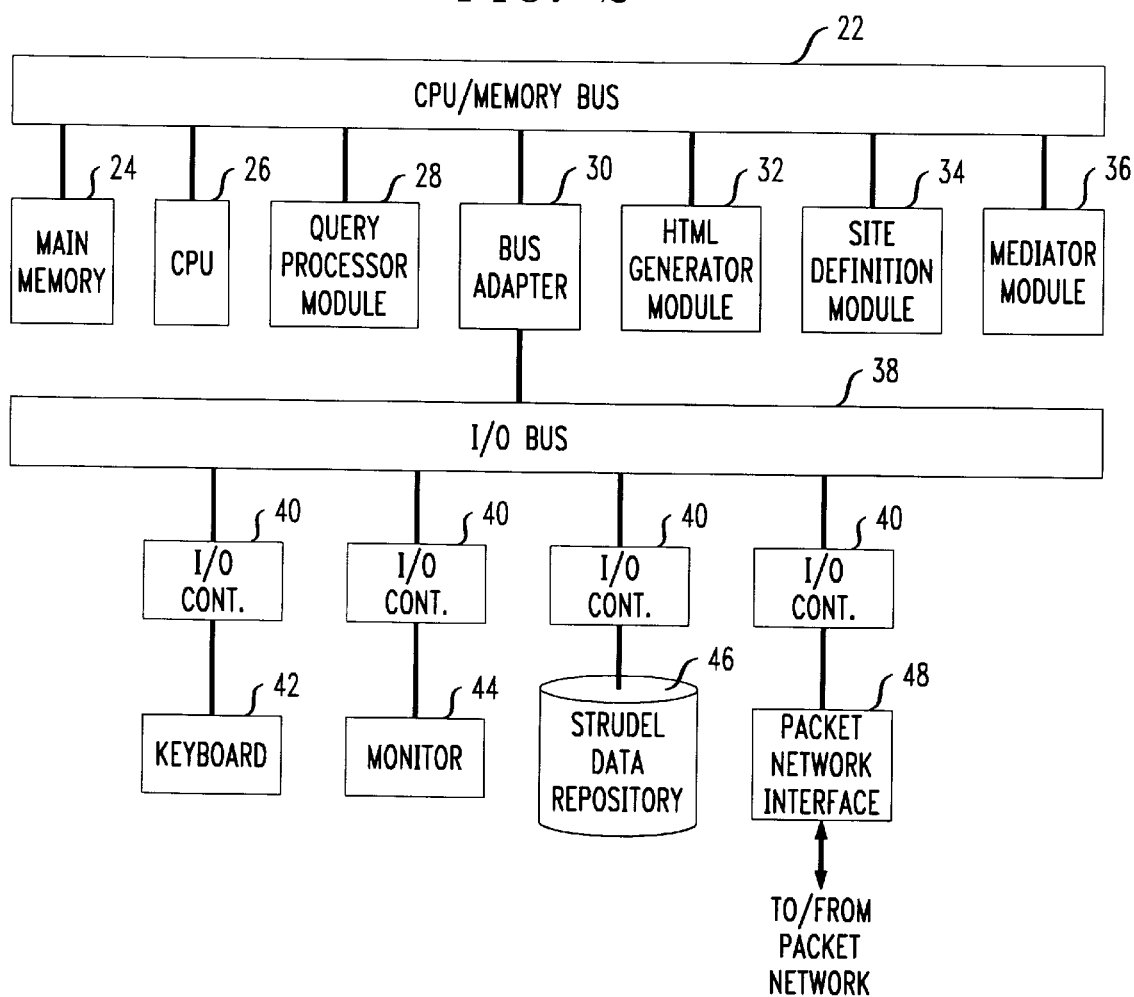
FIG. 2 is a block diagram of a server implementing the functionality of STRUDEL in accordance with one embodiment of the invention.

FIG. 2 is a block diagram of a server implementing STRUDEL in accordance with one embodiment of the invention. Server 12 communicates with WWW 14 through a communications link. Server 12 comprises a main memory module 24, a central processing unit (CPU) 26, a query processor module 28, a bus adapter 30, a HTML generator module 32, a site definition module 34, and a mediator module 36, each of which is connected to a CPU/memory bus 22 and an Input/Output (I/O) bus 38 via bus adapter 30 as shown in FIG. 2. Further, server 12 contains multiple I/O controllers 40, as well as keyboard 42, a monitor 44, a STRUDEL data repository 46, and a packet network interface 48, each of which is connected to I/O bus 38 via I/O controllers 40.

The overall functioning of server 12 is controlled by CPU 26, which operates under the control of executed computer program instructions that are stored in main memory 24. Main memory 24 may be any type of machine readable storage device, such as random access memory (RAM), read only memory (ROM), programmable read only memory (PROM), erasable programmable read only memory (EPROM), electronically erasable programmable read only memory (EEPROM), magnetic storage media (i.e., a magnetic disk), or optical storage media (i.e., a CD-ROM). Further, server 12 may contain various combinations of machine readable storage devices through other I/O controllers, which are accessible by CPU 26, and which are capable of storing a combination of computer program instructions and data.

CPU 26 includes any processor of sufficient processing power to perform the STRUDEL functionality found in server 12. Examples of CPUs suitable to practice the invention includes the INTEL family of processors, such as the Pentium®, Pentium Pro®, and Pentium II® microprocessors.

Packet network interface 48 is used for communications between server 12 and a packet network, such as a Transmission Control Protocol/Internet Protocol (TCP/IP) Network such as the Internet, and WWW 14. Interfaces to other packet networks using different protocols such as X.25 are also possible.

I/O controllers 40 are used to control the flow of information between server 12 and a number of devices or networks such as keyboard 42, monitor 44, STRUDEL data repository 46, and packet network interface 48.

Bus adapter 30 is used for transferring data back and forth between CPU/memory bus 22 and I/O bus 38.

Modules 28, 32, 34 and 36 implement the main STRUDEL functionality for server 12. It is noted that each module 28, 32, 34, and 36 is shown as a separate functional module in FIG. 2. The functionality of each of modules 28, 32, 34, and 36 may be implemented in hardware, software, or a combination of hardware and software, using well-known signal processing techniques. The operation of Server 12, and the functioning of modules 28, 32, 34 and 36, will be described in further detail below with reference to FIG. 3.

Figure 3:
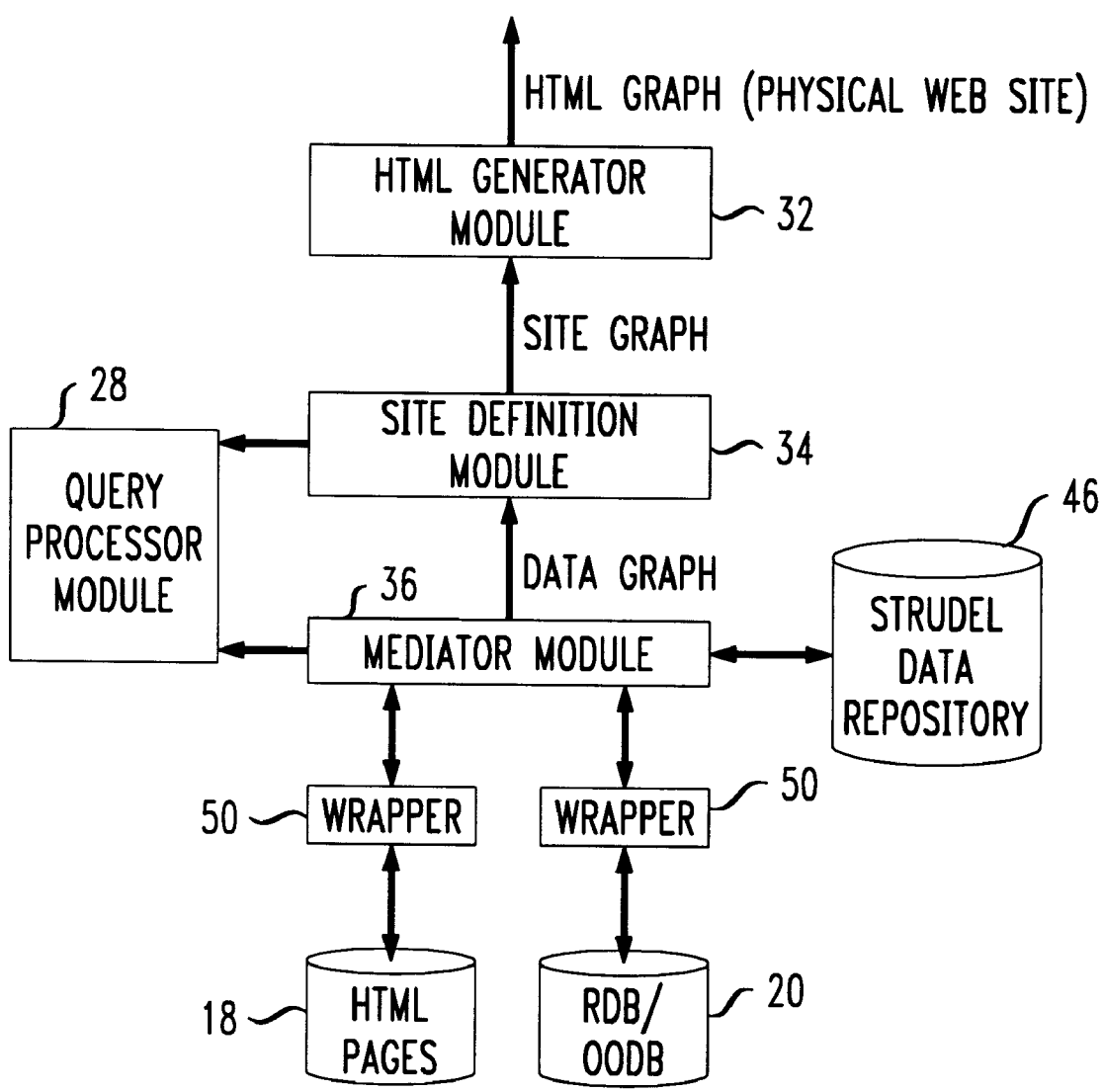
FIG. 3 is a block-flow diagram in accordance with one embodiment of the invention.

FIG. 3 is a block-flow diagram in accordance with one embodiment of the present invention. As shown in FIG. 3, STRUDEL models the data at different levels as graphs. That is, the data in the external sources, the data in the integrated view and the web site itself are modeled as graphs. A graph model is appropriate since site data may be derived from multiple sources, such as existing data base systems and HTML files. Consequently, a query language is used for: (1) defining the integrated view of the data; and (2) defining the structure of web sites. The query language should be capable of constructing graphs. Further, the query processor should be able to answer queries that involve accessing different data sources. Although the sources of data are modeled as containing graphs, there may not be a uniform representation of graphs. Hence, the query processor needs to adhere to possible limitations on access to data in the graphs,, and should be able to exploit additional querying capabilities that an external source may have. A query language and query processor suitable for use with this embodiment of the invention will be discussed in more detail later.

In STRUDEL, data at every level of the system is viewed uniformly as a graph. Referring again to FIG. 3, data is stored in a STRUDEL data repository or in external sources, such as RDB/OODB 20 and HTML page 18, at the bottom most level. External sources may have a variety of formats, but each is translated into the graph data model by a wrapper 50. A wrapper acts as a translator from one data model to another. An example of a wrapper suitable for use by STRUDEL is discussed in a paper by Y. Papakonstantinou et al. titled "A query translation scheme for rapid implementation of wrappers", Int'l Conf. on Deductive and Object-Oriented Databases, 1995, which is incorporated by reference herein.

This embodiment of the invention utilizes a graph model similar to that of an object exchange model (OEM), which is described in an article authored by Y. Papakonstantinou et al titled "Object Exchange across heterogeneous information sources," published in *Proceedings IEEE International Conference on Data Engineering,* March 1995, which is incorporated by reference herein. A data graph contains objects connected by directed edges labeled with string valued attribute names Objects are either nodes, carrying a unique objected identifier (OID), or are atomic values, such as integers, strings, files and so forth. This embodiment of the invention also provides named collections of objects, i.e., sets of OIDs. These names and collections of objects, however, can also be represented as a wide sub tree.

The central data repository for this embodiment of the invention is the data graph. A data graph describes the logical structure of all the information available at that site. STRUDEL obtains a data graph using a mediator module 36. Mediator module 36 integrates information from the various external sources into a single data graph accessible by the STRUDEL system. An example of a mediator capable of working with the STRUDEL system includes the mediator disclosed in U.S. Pat. No. 5,600,831 ("Levy Patent"), issued on Feb. 4, 1997, and which is incorporated by reference herein. Once the data graph is established, a site builder can define one or more site graphs. STRUDEL generates a site graph using a site definition module 34. Each site graph represents the logical structure of the information displayed at the site (i.e., a node for every web page and attributes describing the information in the page and links between pages). There can be several site graphs, because one site may offer several views of its data, with each site graph corresponding to one view.

Once the data graph and site graph are generated for a web site, STRUDEL uses a HTML generator module 32 to construct a browsable HTML graph from the site graph. The HTML generator creates a web page for every node in the site graph, using the values of the attributes of the node.

The STRUDEL system can be illustrated using the following example. A web site manager uses terminal station 10 to access server 12. To create a new web site, or to define a new domain of information to display at an existing web site, the web site manager generates a query statement ("information definition query") defining the scope of information to be displayed at the definition web site. STRUDEL uses a proprietary query language referred to as Site Transformation Und Query Language (StruQL), which is discussed in more detail later. The information definition query statement is processed by query processor 28, which passes on the processed query statement to Mediator module 36. Query processor 28 processes the query statement, and in some instances, optimizes the query statement to perform a better search.

Mediator module 36 accesses STRUDEL data repository 46 to search for information in accordance with the information definition query statement. Mediator module 36 also accesses the Internet and WWW 14 to search, for example, external sources such as RDB/OODB 20 and/or HTML pages 18 for the specified information. To augment this search, Mediator module 36 would be robust enough to work within any limitations on access to data in the external source graphs, and should be able to exploit additional querying capabilities that an external source may have. Mediator module 36 then creates an integrated view of all the data that will be available at the site found in the multiple external sources and STRUDEL data repository 46. This integrated view is stored as a data graph in accordance with the techniques discussed in more detail in the Levy Patent.

Once Mediator module 36 creates the data graph, the web site manager generates a query defining the actual structure of the web site ("site definition query"). The structure is defined as a structural view over the integrated view, i.e., a node for every web page and attributes describing the information in the page and links between pages. Different versions of the web site can be defined by specifying multiple structural views. The site definition query is processed by query processor 28, and is passed on to site definition module 34. A site graph is created for each structural view.

Once the data graph and site graph(s) are created, HTML generator module 32 constructs a browsable HTML graph in accordance with each site graph. HTML generator 32 creates a web page for every node in the site graph, using the values of the attributes of the node.

Thus, for example, assume that a web site manager wants to create a web site having all Post Script papers directly accessible from home/root pages. The web site manager would construct an information definition query (described in more detail below) which is possessed by query processor 28, and passed to mediator module 36. Mediator module 36 would create a data graph with this information. Also assume that the web site manager would want each PostScript paper presented in the following format: Title, Author, Cite, and Abstract, with links to related articles. The web site manager would construct the appropriate site definition query, which is processed by query processor 28, and passed to site definition 34. Site definition 34 would create the appropriate site graph. HTML generator module 32 would then create a web page for every node in the site graph, using the values of the attributes of the node.

The Query Language

STRUDEL needs to query and/or to transform graphs: (1) at the integration level, when data from different external sources is integrated into the data graph, and (2) at the site-graph definition level, when site graphs are constructed from a data graph. In addition, STRUDEL's design provides an interface for ad-hoc queries over a web site. A query and transformation language referred to as StruQL is used at all three levels.

StruQL's core fragment is described next. A StruQL query has the form:

```
where C_1, ... ,C_k,
[create N_1, ... ,N_n]
[link L_1, ... ,L_p]
[collect G_1, ... ,G_q]
```

For example, the following query returns all PostScript papers directly accessible from home pages:

```
where HomePages(p),p "Paper" q, isPostScript(q)
collect PostScript Pages(q)
```

Here HomePages is a collection, "Paper" is an edge label, and isPostScript is a predicate testing whether node q is a PostScript file. The condition p "Paper" q means that there exits an edge labeled "Paper" from p to q. The query constructs a new collection, PostScriptPages, consisting of all answers.

In the general syntax, each condition $C_1, \ldots, C_4$ in a where clause either (1) tests collection membership, e.g., HomePages(p), or (2) is a regular path expression, e.g., p "Paper" q, or (3) is a built-in or external predicate applied to nodes or edges, e.g., isPostScript(q), x>y, or (4) is a boolean combination of the above. A condition of the form "x R y" means that there exists a path from node x to node y that matches the regular path expression R. Regular path expressions are more general than regular expressions, because they permit predicates on edges and nodes. For example "isName*" is a regular path expression denoting any sequence of labels such that each satisfies the isName predicate. In particular, true denotes any edge label, and true* any path; we abbreviate the latter with *. Other operators include path concatenation and alternation; the grammar for regular path expression is: R::= Pred|Pred;Pred|R.R|(R|R)|R*. The expression "Pred1;Pred2" matches any edge, node pair whose edge satisfies Pred1 and whose node satisfies Pred2. Pred is shorthand for the idiom "Pred;true", which ignores the node value. For example,

```
where Root(p), p (true; not (Homepage))*q
collect Result(q)
``` returns all nodes q accessible from paths that begin at the root and that do not go through any HomePage. This assumes that Root is a collection consisting of the graph's single root node.

StruQL extends these regular-expression based selections with the creation of new graphs from existing graphs; its create, and link clauses specify new graphs. The following example copies the input graph and adds a "Home" edge from each node back to the root:

```
where Root(p), p * q, q l q'
create N(p), N(q), N(q')
link N(q)l N (q'), N (q) "Home" N(p)
collect NewRoot (N(p))
```

N is a Skolem function creating new object OIDs. The query first finds all nodes q reachable from the root p (including p itself) and all nodes q' directly accessible from q by one link labeled l. For each node q and q', it constructs new nodes N (q) and N(q'): in effect, this copies all nodes accessible form the root once. The query adds a link l between any pair of nodes that were linked in the original graph and adds a new Home link that points to the new root. Finally, it creates an output collection NewRoot that contains the new graph's root.

A similar query produces a site graph, i.e., a view of the input graph, called TextOnly, that excludes any nodes that contain image files:

```
where Root(p), P* q, q l q', not (isImageFile(q'))
create N (p), N(q), N(q')
link N(q) l N(q¹)
collect TextOnlyRoot(N(p))
```

Other constructs are also possible for supporting regular path expressions.

A distinguishing feature of StruQL is that its semantics can be described in two stages. The query stage depends only on the where clause and produces all possible bindings of variables to values that satisfy all conditions in the clause; its result is a relation with one attribute for each variable. The construction stage constructs a new graph from this relation, based on the create, link, collect clauses. These details are explained next.

An active-domain semantics is adopted for StruQL. For a data graph G, let O be the set of all OIDs and L the set of all labels in G. Let V be the set of all node and edge variables in a query. The meaning of the where-clause is the set of assignments $\theta: V \rightarrow O \cup L$ that satisfy all conditions in the where clause. Each assignment maps node variables to O and edge variables to L. The meaning of the create-link-collect clauses is as follows. For each row in the relation, first construct all new node OIDs, as specified in the create clause. Assuming the latter is create $N_1, \ldots, N_n$, each $N_i$ is a Skolem function applied to node OIDs and/or label values. By convention, when a Skolem function is applied to the same inputs, it returns the same node OID. Next, construct the new edges, as described in the link clause. Two semantic conditions are imposed on StruQL's queries: first each node mentioned in link or collect is either mentioned in create or is a node in the data graph. Second, edges can only be added from new nodes to new or existing nodes; existing nodes are immutable and cannot have edges added to them. Thus, link f (x)"A"f(y) and link f (x) "A"y are legal, but link x"A"f(y) is not, because the latter would alter the old graph. The semantic of the collect clause is fairly straightforward.

Under the active-domain semantics for StruQL, every StruQL query has a well-defined meaning. For example, the query below returns the complement of a graph, i.e., the result graph contains an edge labeled l between two nodes if and only if no such label exists between the corresponding nodes in the input graph:

```
where not (p l q)
create f(p), f(q)
link f(p) l f(q)
```

The active-domain semantics, however, is unsatisfactory because it depends on how we define the active domain; the semantics changes if, for example, the active domain is computed only for the accessible part of the graph. The situation is similar to the domain independence issue in the relational calculus: there it is solved by considering range-restricted queries, which are guaranteed to be domain independent, i.e., their semantics do not change if the active domain is artificially changed.

StruQL's regular path expressions require graph traversal and, therefore, the computation of transitive closure. The ability to compute the transitive closure of an input graph does not imply the ability to compute the transitive closure of an arbitrary binary or 2n-ary relation. StruQL can express transitive closure of an arbitrary relation as the composition of two queries. For example, consider the tree-encoding of a binary relation R (A,B) with attributes A and B, as shown below. All nodes reachable from "x" can be calculated with two StruQL queries. The first constructs the graph corresponding to the relation R(A,B), and the second uses the regular expression * to find all nodes accessible from the root. Input is a keyword that specifies the input to a query.

```
input (where Root(r) , r "tup" s1, r "tup" s2,
        S1 "A" x1, S1 "B" y1
        s2 "A" x2, s2, "B" y2
        y1 = x2
    create N(y1), N(x2)
    link N(yl) "bogus" N(x2)
    collect New Root (N("x")))
where New Root(x), x * N (y)
collect Result(y)
```

StruQL has the same expressive power as first order logic extended with transitive closure, FO+TC. That is, considering a two-sorted (with sorts Oid and Label), first order vocabulary=$\{E, C_1, \ldots, C_k\}$, where E (Oid, Label, Oid) is the edge relation and $C_1$(Oid), ... $C_k$(Oid) are the collections, then a boolean query over this vocabulary is expressible in pure StruQL (i.e., without external predicates) if and only if it is expressible in FO+TC.

The query stage of StruQL can also construct a new output graph. This feature is more powerful than conventional query languages.

An evaluation strategy based on StruQL's active-domain semantics is prohibitively inefficient, because the semantics constructs an intermediate relation whose size may be much larger than that of the input graph. In general, such a strategy is also unnecessary, because transformation queries typically require at most one traversal of the input graph and may not require the computation of an intermediate relation at all. Assuming that all data in materialized in data graphs, query evaluation strategies could be applied for other semi-structured languages to StruQL and use optimization techniques that minimize or eliminate graph traversal. STRUDEL data, however, may be stored in external sources, and therefore, evaluation strategies that adhere to limitations of external sources and can use the query capabilities of the sources whenever possible we desired. Identifying such evaluation strategies is non-trivial, because although data in external sources is modeled as data graphs, the external sources may not support queries that traverse arbitrary paths through the data. In particular, evaluation strategies are desired that can:

Push queries to external sources. STRUDEL data graphs can be created by integrating information from external sources. A simple strategy is to materialize external sources as data graphs and evaluate queries on the materialized graphs. A better strategy is to delay fetching of external data by pushing queries to the external sources.

Exploit indexes. Indexes may be available for data graph materialized in the data repository and for the external sources. STRUDEL's query processor should use these indexes whenever possible.

Handle limited capabilities. The ability to traverse edges forward and/or backward depends on the capability of a data source. In some externals, links may be traversed only in one direction. For example, the AT&T employee database requires certain attribute values such as last name or phone number, in order to extract any information. In STRUDEL's data model, this translates into certain edges being traversable in one direction.

To address all these requirements, it is advantageous to apply different optimization strategies to different representation of a query, so that at each level different kinds of optimizations can be expressed. Three representations are used: (1) StruQL's abstract syntax, (2) automata that compute regular path expressions, and (3) a physical query plan that incorporates the capabilities of the data source. Examples of optimizations at each level, are shown which essentially rewrite a query into an equivalent representation at the same level and/or translate the query into the representation at the next level. It is possible to combine such isolated optimization strategies using the techniques discussed in an Ph.D. thesis authored by Daniela D. Floresen titled "Design and Implementation of the Flora Object Oriented Query Optimizer", Institut National de Rechershe and Informatique (INRIA), 1996, which is incorporated by reference herein.

Abstract syntax level. At this level, source-to-source transformations are applied to reduce the number of edges that must be traversed in the input graph. This is accomplished by finding common prefixes in multiple regular path expressions. For example, consider

```
where Root (p),
    p ("A"."B")*."A"q,
    p "A"."C"."D" r
```

The first regular expression can be rewritten into an equivalent expression:

```
where Root(p),
    p "A".("B"."A")*q,
    p "A"."C"."D" r
```

Next, two node variables, x and y are introduced:

```
where Root(p),
    p "A" x,
    x ("B"."A")*q
    p "A" y,
    y "C". "D" r
```

Finally, if q and r are "independent", meaning that none of the clauses in link creates an edge between them, then x and y node variables can be collapsed into a single variable z, and results in:

```
where Root(p),
    p "A" z,
    z ("B"."A")*q,
    z "C"."D" r
```

The resulting query is equivalent to the original, but it traverses each edge "A" accessible from the root once.

Figure 4:
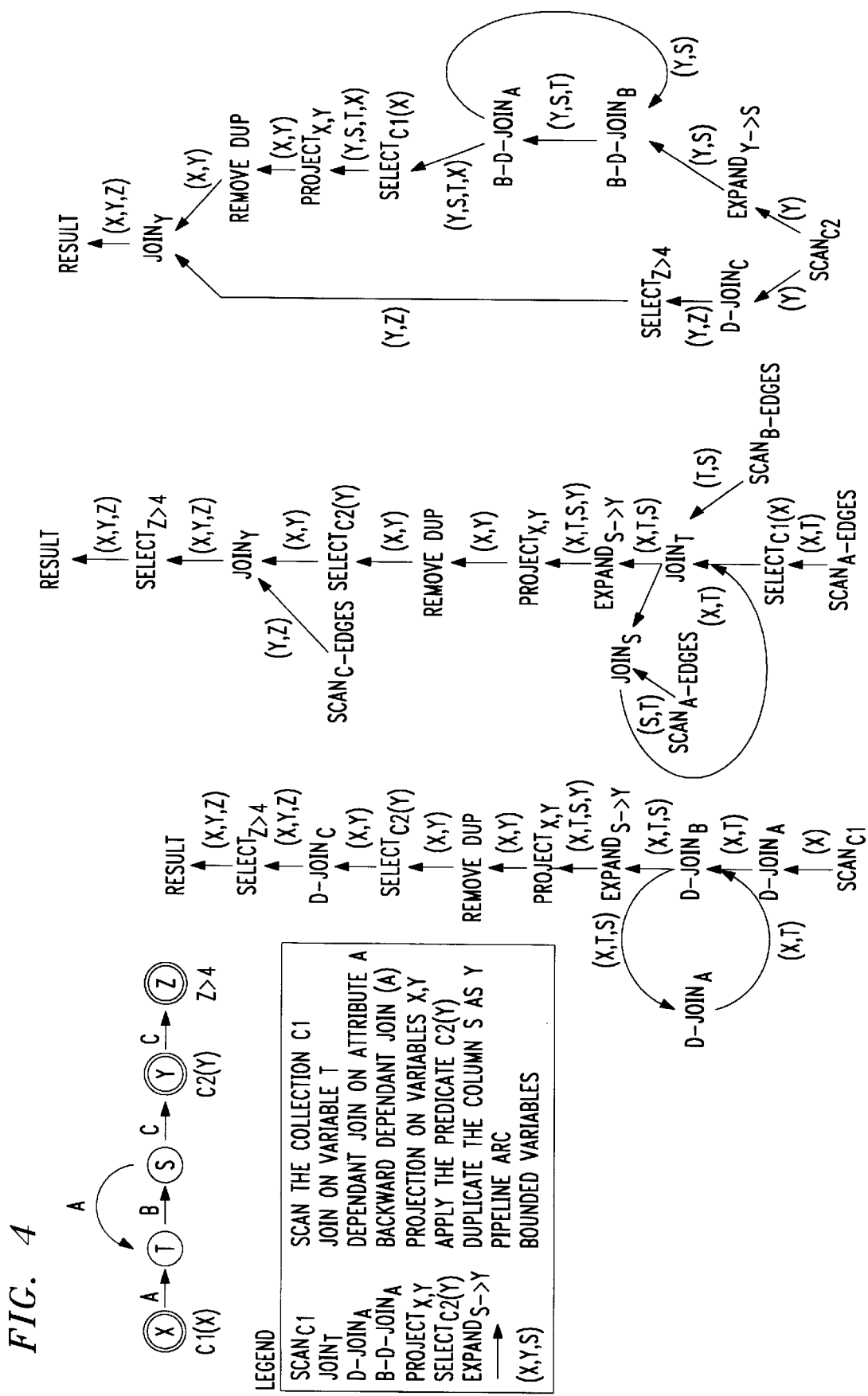
FIG. 4 illustrates a traversal for a query in accordance with one embodiment of the invention.

Automation level. At this level, each regular expression is translated into a generalized Non-Deterministic Finite Automaton (NDFA). There is one automaton for each condition in the where clause. The simplest way to execute an automaton is to traverse it from its input state to its output state(s), but more complex traversals are also considered, which start at some arbitrary state(s), resulting in alternative physical execution plans. FIG. 4 illustrates a traversal for the following query:

```
where C1 (x),x(AB) + y,
    yCZ, C2(y), z > 4.
```

Physical execution plan. The operators at the physical level are the same as those found in relational query plans (see FIG. 4). The physical plans, however, may have cycles. The first two plans in FIG. 4 correspond to the left-to-right traversal of the automaton: they differ only in the fact that the first has a direct join while the second has a join. The third execution plan corresponds to starting the automata in the state Y: this could be advantageous if, for example, there is fast access to the collection C2. Then the plan branches, searching for a C edge to Z on one hand, and for a backwards path to X on C1 on the other hand. At the end it has to join the two results based on Y.

The present invention uses an algebra for querying semi-structured data. Regular expressions are considered as atomic operations in this algebra (as part of the tree patterns in the scan operator). This results in optimized queries at the select-project-join level. The present invention also optimizes inside regular expressions so that STRUDEL's execution plans are more fine grained, and generally have cycles.

Although a preferred embodiment is specifically illustrated and described herein, it will be appreciated that modifications and variations of the present invention are covered by the above teachings and within the purview of the appended claims without departing from the spirit and intended scope of the invention. For example, although STRUDEL is implemented on the server side in the embodiment of the invention, STRUDEL could be implemented on the client side and still fall within the scope of the invention. Further, although this embodiment of the invention presents information at a web site using HMTL, any graphical presentation language falls within the scope of the invention.

What is claimed is:

1. A method for managing a web-site, comprising the steps of:
   receiving an information definition query for defining an integrated view of non-uniform information retrieved from a plurality of sources and stored in a plurality of formats;
   creating said integrated view according to said information definition query;
   receiving a site definition query for defining a site view for said non-uniform information at the web-site;
   creating said site view according to said site definition query; and
   presenting said non-uniform information on the web-site.

2. The method of claim 1, wherein said non-uniform information is graphically presented.

3. The method of claim 2, wherein said non-uniform information is graphically presented using a Hypertext Markup Language format.

4. The method of claim 3, wherein said information is stored in at least one of a group of formats comprising a Hypertext Markup Language format, a Relational Database format, an Object Oriented Database format, and a uniform system format.

5. The method of claim 4, wherein said uniform system format is a STRUDEL format.

6. The method of claim 5, wherein said plurality of sources are accessible via a network.

7. The method of claim 6, wherein said network is a packet-switched network.

8. The method of claim 7, wherein said packet-switched network is a World Wide Web network.

9. The method of claim 8, wherein said non-uniform information is retrieved from each source utilizing a search mechanism appropriate for accessing information stored therein, and wherein said integrated view is created using said search mechanism.

10. The method of claim 9, wherein multiple site definition queries, and said integrated information is structured according to each site definition query.

11. The method of claim 1, wherein said integrated view is created using a data graph.

12. The method of claim 1, wherein said site view is created using a site graph.

13. The method of claim 1, wherein said non-uniform information is presented using a Hypertext Markup Language generator.

14. The method of claim 1, further comprising the step of processing a user defined query to generate said information definition query and site definition query.

15. The method of claim 1, wherein said query statements are generated using StruQL.

16. An apparatus for managing a web-site, comprising:
   means for receiving an information definition query for defining an integrated view of non-uniform information retrieved from a plurality of sources and stored in a plurality of formats;
   means for creating said integrated view according to said information definition query;
   means for receiving a site definition query for defining a site view for said non-uniform information at the web-site;
   means for creating said site view according to said site definition query; and
   means for presenting said non-uniform information on the web-site.

17. The apparatus of claim 16, wherein said non-uniform information is graphically presented.

18. The apparatus of claim 17, wherein said non-uniform information is graphically presented using a Hypertext Markup Language format.

19. The apparatus of claim 18, wherein said information is stored in at least one of a group of formats comprising a Hypertext Markup Language format, a Relational Database format, an Object Oriented Database format, and a uniform system format.

20. The apparatus of claim 19, wherein said uniform system format is a STRUDEL format.

21. The apparatus of claim 20, wherein said plurality of sources are accessible via a network.

22. The apparatus of claim 21, wherein said network is a packet-switched network.

23. The apparatus of claim 22, wherein said packet-switched network is a World Wide Web network.

24. The apparatus of claim 23, wherein said non-uniform information is retrieved from each source utilizing a search mechanism appropriate for accessing information stored therein, and wherein said integrated view is created using said search mechanism.

25. The apparatus of claim 24, wherein multiple site definition queries, and said integrated information is structured according to each site definition query.

26. The apparatus of claim 16, wherein said integrated view is created using a data graph.

27. The apparatus of claim 16, wherein said site view is created using a site graph.

28. The apparatus of claim 16, wherein said non-uniform information is presented using a Hypertext Markup Language generator.

29. The apparatus of claim 16, further comprising a means for processing a user defined query to generate said information definition query and site definition query.

30. The apparatus of claim 16, wherein said query statements are generated using StruQL.

31. An apparatus for managing a web-site, comprising:
   a terminal;
   a network coupled to said terminal;
   a plurality of servers storing non-uniform data connected to said network and accessible via said terminal;
   a query processor coupled to said servers via said network for defining an integrated view of said non-uniform data;
   a mediator coupled to said query processor for receiving said definition via a site definition query, and creating said integrated view;
   a site definition module coupled to said mediator and said query processor for receiving a site definition query from said query processor for structuring said non-uniform data at the web-site; and
   a hypertext markup language generator for graphically presenting said structured non-uniform data at the web-site.

32. A computer for managing a website, comprising:
   a memory containing:
      a program for receiving an information definition query for defining an integrated view of non-uniform information retrieved from a plurality of sources and stored in a plurality of formats;
      a program for creating said integrated view according to said information definition query;
      a program for receiving a site definition query for defining a site view for said non-uniform information at the web-site;
      a program for creating said site view according to said site definition query;
      a program for presenting said non-uniform information on the web-site; and
   a processor coupled to said memory for running said programs.

* * * * *